Sept. 5, 1961 J. C. FORSBERG 2,998,814
BARBECUE FUEL TRAY MECHANISM
Filed Sept. 3, 1958
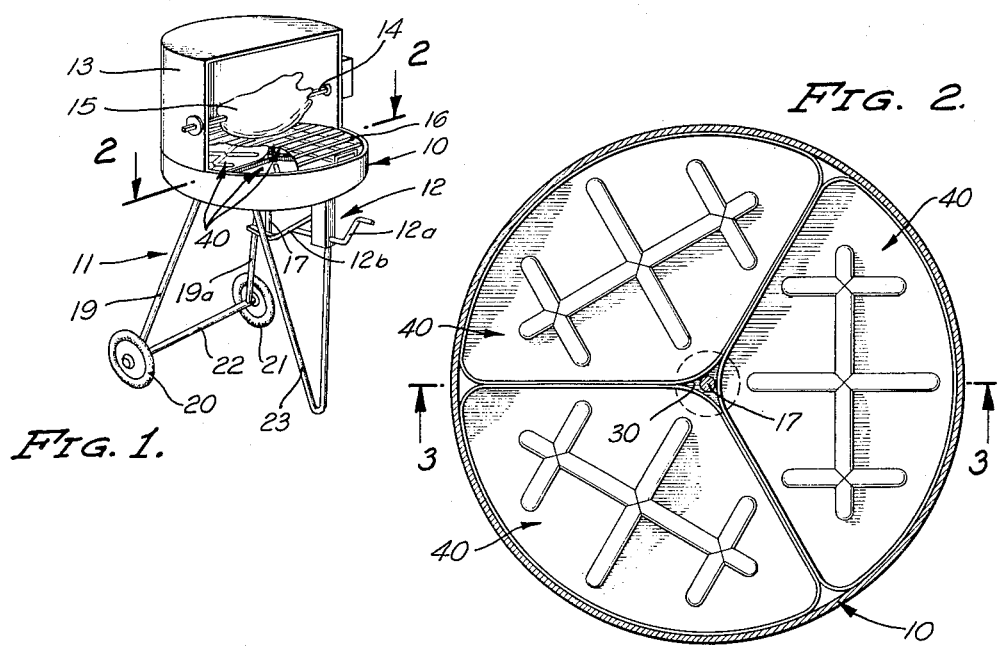
FIG. 1.
FIG. 2.
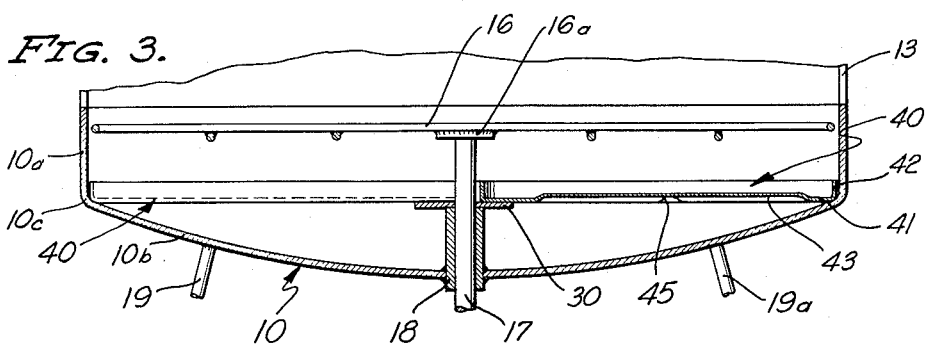
FIG. 3.
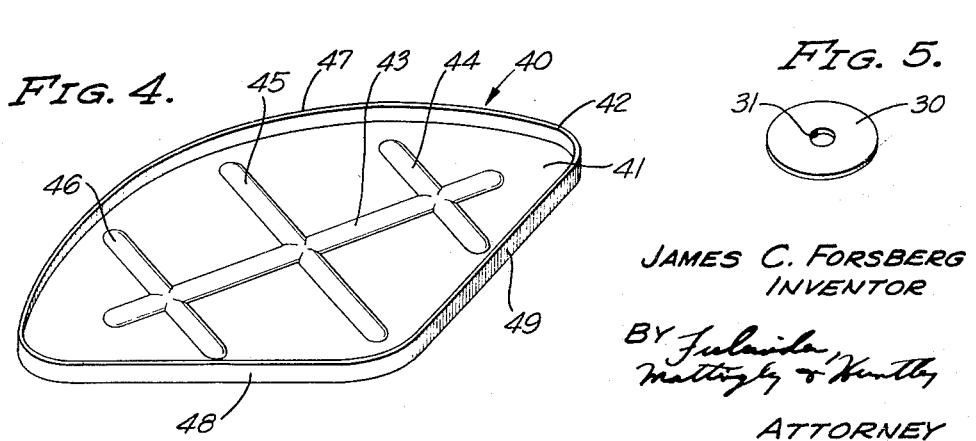
FIG. 4.
FIG. 5.
JAMES C. FORSBERG
INVENTOR
BY
ATTORNEY

United States Patent Office 2,998,814
Patented Sept. 5, 1961

2,998,814
BARBECUE FUEL TRAY MECHANISM
James C. Forsberg, 915 W. Highland Ave.,
Redlands, Calif.
Filed Sept. 3, 1958, Ser. No. 758,846
3 Claims. (Cl. 126—25)

This invention relates generally to barbecuing apparatus and more particularly to an improved portable barbecue fuel tray mechanism to be inserted in a portable barbecue brazier.

One of the most popular of such devices is the type which consists of an upwardly concave charcoal burning bowl mounted upon a portable and wheeled mounting frame and having an adjustable grill located therein. Some of the more refined and expensive of the units of this nature also provide a rotisserie and hood.

Such devices are quite convenient in use but have the common difficulty that quite a large amount of charcoal or other fuel is required to fill the bowl and provide heat, or that sand or gravel must be placed in the lower portion to provide a sub surface for the fuel. The use of such materials creates a cleaning problem and because of the weight of units of this nature and also because of the complicated mechanisms used with the rotisseries cleaning becomes a difficult problem.

I have devised a means for reducing the amount of charcoal or other fuel used in such portable barbecuing devices; of providing for easy cleaning; and providing for more efficient utilization of the heat provided from the fuel. I have accomplished this by the use of special trays which cooperate with the natural contour of the charcoal bowl of the usual portable barbecuing apparatus and with a special washer as hereinafter described.

It is a major object of my invention to provide fuel trays for portable barbecue apparatus; it is a further object of my invention to provide fuel trays for portable barbecue apparatus which cooperate with the natural contour thereof and suspend the fuel above the lower portions of the fuel bowl of such apparatus; it is still a further object of my invention to provide fuel trays which lend themselves to simplified cleaning; it is a still further object of my invention to provide fuel trays as described which enable partial firing of the fuel for conservation thereof; it is still a further object of my invention to provide fuel trays to hold the level of fuel at a uniform distance beneath the grill of portable barbecue apparatus.

The foregoing and other advantages and objects of my invention will be more readily apparent from the following description and the appended drawings, in which:

FIGURE 1 is a perspective of a portable barbecue apparatus in which my invention is utilized;

FIGURE 2 is a section through the area 2—2 of FIGURE 1 and beneath the grill;

FIGURE 3 is a section through the direction 3—3 of FIGURE 2 but with the grill in position and showing a portion of the hood of FIGURE 1 in the background and showing a portion only of the suspension apparatus;

FIGURE 4 is a perspective of a preferred embodiment of one of a number of uniform identical trays which are used to constitute my invention; and FIGURE 5 is a special washer which is used to cooperate with the trays in the preferred embodiment of my invention.

Paying particular attention to FIGURE 1 of the attached drawings there is seen a portable barbecue apparatus of customary design which is well known to those skilled in the art and representative examples of which are found in hardware and other stores handling such supplies.

Such device consists of a fuel bowl 10 supported on a mounting frame 11 and consisting in part of legs 19 and 19a having axle 22, and a V-shaped tripod leg 23. The mechanism shown generally as 12 utilizes a threaded handle 12a and lever 12b to raise and lower shaft 17 which raises and lowers grill 16 relative to ground, or horizontal level. Many more refined models also include a hood 13 with a rotisserie 14. In the figure provided herein meat 15 is shown on the rotisserie 14.

Portions of three trays, each identical and each given the common number 40 are shown under the broken away portion of the grill 16.

In the use of such apparatus as is indicated and particularly if it does not contain the trays 40 of my invention, charcoal or other fuel is placed in the bowl 10 and set on fire. Food to be barbecued is either placed on the grill 16 or upon the rotisserie 14 and receives the heat from the fuel in the bowl 10.

The grill 16 may be raised or lowered to allow the food upon said grill to receive more or less heat from the fuel in the bowl 10. This is accomplished by turning the handle 12a of the lifting mechanism 12 which presses against the lever 12b and forces it upward or lowers it downward. The lever 12b in turn presses upward against the shaft 17 which supports the grill 16 and thus either raises or lowers it relative to the position of the fire in the bowl 10.

When the trays 40 of my invention are utilized the mechanism works in identically the same fashion except that the fuel utilized is placed within the trays 40 rather than directly in the bowl 10.

Now turning more particular attention to FIGURES 2 and 3 it will be seen that the grill 16 rests upon a collar 16a which fits upon the shaft 17. The shaft 17 slides within the cylinder 18 which is welded within the center of the bowl 10 and extends upward into the bowl 10 a short distance as shown particularly in FIGURE 3.

Trays 40 are constructed so that three or any other desired number will fit together to completely fill the area (a circular area of the bowl 10). The circular bowl 10 of the barbecue apparatus as herein described customarily has an upstanding rim 10a and an upwardly concave bottom or lower portion 10b. A natural shoulder 10c is formed where the upstanding rim 10a meets the concave portion 10b.

The cylinder 18 or central upstanding tube in which the shaft 17 moves vertically customarily has a length approximately level with the natural shoulder 10c heretofore defined.

A washer 30 forms an extended support and consists of a disk of aluminum or other suitable material having a diameter considerably larger than the diameter of the cylinder 18. A hole 31 is provided in the center of the washer 30 which hole is of a diameter less than the outer diameter of cylinder 18 and greater than the diameter of the shaft 17.

Each of the trays 40 is formed of a generally sector shaped bottom 41 or wedge shaped section having one circumferential edge 47 constituting an arcuate peripheral wall which is formed on a radius slightly less than the inner radius of the bowl 10. In the particular example shown in the enclosed drawings, three sections have been used although it is to be understood that two sections or a greater number of sections could be used to accomplish a similar result. The circumferential edge or wall 47 of the tray 40 extends for a distance approximately ⅓ the circumference of the bowl 10. Two sides 48 and 49 constitute converging radial walls upstanding from the bottom and run inwardly as shown to define a tray to occupy approximately ⅓ of the horizontal area of the bowl 10.

The tray 40 is formed of a flat bottom of aluminum or other suitable material having a reinforcement consisting of a pressed design comprising a lengthy dedent 43 with dedents 44, 45 and 46 perpendicular thereto. Such a configuration provides strength to the trays such that the heat and weight of the fuel will not deform the same.

The tray has formed wall 42 extending completely around it being formed integrally with the bottom portion 41.

In use the washer 30 is placed over the shaft 17 when the grill 16 is removed therefrom. The three trays 40 are then placed within the bowl 10 such that their circumferential edges 47 are contiguous to the rim 10a and rest on the shoulder 10c. The inner corner of each tray 40 where the inward defining sides 49 and 48 meet rests upon the washer 30 and thus suspend each tray 40 above and substantially bridging the subjacent portion of the concave bottom 10b of the bowl 10.

In practical use if a portable barbecue apparatus is being used for a small family meal one or two of the trays 40 may be ignited rather than wasting the fuel necessary to ignite the entire bowl 10 as in the normal practice. Thus smaller amounts of fuel are used. When desired all three trays may be ignited providing a uniform heat over the entire area under the grill.

It will be observed that a thin layer of fuel placed in each of the trays 40 will provide fuel throughout the area ignited at a uniform distance below the grill and will provide equal heat for food placed in the center or at the outer edges of the grill.

While the embodiment of my invention shown and described herein is fully capable of performing the objects and advantages desired it will be clear to those skilled in the art that many modifications may be made without departing from the inventive concept disclosed herein and it is not intended that this invention be limited thereto but only as required by the appended claims.

I claim:

1. In a barbecue device having a circular bowl with an upwardly concave bottom merging with an upstanding rim to form a shoulder and having a central upstanding tube through which a vertically movable shaft projects and a grill supported on said shaft, the combination of a barbecue fuel tray mechanism comprising means resting upon said tube and surrounding said shaft for providing an extended support, and a tray having a sector-shaped bottom with an arcuate peripheral wall and converging radial walls upstanding therefrom, said tray contiguous to said arcuate wall resting on said bowl on said shoulder and said tray contiguous to the convergence of said radial walls being clear of said shaft and resting on said means.

2. In a barbecue device having a circular bowl with a downwardly depressed bottom merging with an upstanding rim to form a shoulder and having means at the level of said shoulder and upstanding from said bowl forming an annular support centrally of said bowl, the combination of a barbecue fuel tray mechanism comprising a tray having a substantially flat sector-shaped bottom with an arcuate peripheral wall and radial peripheral walls upstanding therefrom resting upon said bowl on said shoulder and to resting upon said annular support means in a position substantially bridging the subjacent portion of said bowl bottom.

3. In a barbecue device having a circular bowl of predetermined radius and formed with a downwardly depressed bottom having a peripheral shoulder and having an upstanding support disposed centrally of said bowl, said support being provided with a central passage and extending to the level of said shoulder the combination of a barbecue fuel tray mechanism comprising a tray having a bottom shaped in plan substantially as a sector of a circle of just less than said predetermined radius and having an arcuate peripheral wall upstanding from the periphery of said bottom and resting on said shoulder and radial peripheral walls integral with and upstanding from the periphery of said bottom, said radial walls at their radially inward portions merging with a smoothly curved peripheral wall overlying and resting upon said support and clearing said passage.

References Cited in the file of this patent

UNITED STATES PATENTS

| | | |
|---|---|---|
| D. 160,688 | Brock | Oct. 31, 1950 |
| 710,571 | Fletcher | Oct. 7, 1902 |
| 1,054,321 | Sinks | Feb. 25, 1913 |
| 1,532,526 | Zach | Apr. 7, 1925 |
| 1,561,543 | Hoult | Nov. 17, 1925 |
| 2,074,564 | Scurlock | Mar. 23, 1937 |
| 2,101,180 | Jacobs | Dec. 7, 1937 |
| 2,148,439 | Crawford | Feb. 28, 1939 |
| 2,174,425 | Schlumbohm | Sept. 26, 1939 |
| 2,608,191 | Schmidt et al. | Aug. 26, 1952 |
| 2,740,395 | Goodwin | Apr. 3, 1956 |
| 2,797,633 | Goodwin | July 2, 1957 |
| 2,797,681 | Crosley et al. | July 2, 1957 |
| 2,925,028 | Haynes et al. | Feb. 16, 1960 |

FOREIGN PATENTS

| | | |
|---|---|---|
| 539,564 | France | Apr. 4, 1922 |
| 16,196 | Great Britain | 1908 |